United States Patent
Kim (10) Patent No.: US 8,644,557 B2
(45) Date of Patent: Feb. 4, 2014

(54) METHOD AND APPARATUS FOR ESTIMATING POSITION OF MOVING VEHICLE SUCH AS MOBILE ROBOT

(75) Inventor: Dong-shin Kim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 127 days.

(21) Appl. No.: 13/296,989

(22) Filed: Nov. 15, 2011

(65) Prior Publication Data

US 2012/0121131 A1    May 17, 2012

(30) Foreign Application Priority Data

Nov. 15, 2010    (KR) .................. 10-2010-0113486

(51) Int. Cl.
*G06K 9/00*    (2006.01)
(52) U.S. Cl.
USPC .......................................................... 382/103
(58) Field of Classification Search
None
See application file for complete search history.

(56) References Cited

U.S. PATENT DOCUMENTS

| | | | |
|---|---|---|---|
| 7,023,432 B2 | 4/2006 | Fletcher et al. | |
| 7,030,875 B2 | 4/2006 | Gupta et al. | |
| 7,142,600 B1 * | 11/2006 | Schonfeld et al. | 375/240.16 |
| 2006/0280249 A1 * | 12/2006 | Poon | 375/240.16 |

FOREIGN PATENT DOCUMENTS

KR    1020100015141 A    2/2010

OTHER PUBLICATIONS

Seungdo Jeong, Jonglyul Chung, Sanghoon Lee, Il Hong Suh, and Byunguk Choi. 2005. Design of a simultaneous mobile robot localization and spatial context recognition system. In Proceedings of the 9th international conference on Knowledge-Based Intelligent Information and Engineering Systems—vol. Part III (KES'05).*
Kim et al. "The Study of the Image Geometric Transforms for Moving Object Detection." 2006 Korea Computer Congress: Collected Papers vol. 33, No. 1 (B).
Li et al. "Scene Reconstruction using MRF Optimization with Image Content Adaptive Energy Functions.", Oct. 2008.

* cited by examiner

*Primary Examiner* — Nirav G Patel
(74) *Attorney, Agent, or Firm* — Sughrue Mion, PLLC (57) ABSTRACT

An apparatus of estimating a position of a moving vehicle such as a robot includes a feature point matching unit which generates vectors connecting feature points of a previous image frame and feature points of a current image frame, corresponding to the feature points of the previous image frame, and determines spatial correlations between the feature points of the current image frame, a clustering unit which configures at least one motion cluster by grouping at least one vector among the vectors based on the spatial correlations in a feature space, and a noise removal unit removing noise from each motion cluster, wherein the position of the moving vehicle is estimated based on the at least one motion cluster.

20 Claims, 5 Drawing Sheets

METHOD AND APPARATUS FOR ESTIMATING POSITION OF MOVING VEHICLE SUCH AS MOBILE ROBOT

CROSS-REFERENCE TO RELATED PATENT APPLICATIONS

This application claims priority from Korean Patent Application No. 10-2010-0113486, filed on Nov. 15, 2010 in the Korean Intellectual Property Office, the disclosure of which is incorporated herein in its entirety by reference.

BACKGROUND

1. Field

Apparatuses and methods consistent with exemplary embodiments relate to estimating a position of a moving vehicle such as a mobile robot.

2. Description of the Related Art

Robots originally refer to automatic dolls having hands and other parts operating like a human and also having a human shape made by assembling mechanical apparatuses therein. Recently, the word "robot" signifies any automated equipment performing a job by itself regardless of its shape. In particular, mobile robots are widely adopted because they can perform an operation on behalf of a human under an extreme environment or in a dangerous place. Also, home mobile robots, such as cleaning robots, for helping housework while moving around in a house by itself, have been widely distributed.

In order for a robot to automatically perform various jobs, the robot is capable of moving by itself. To address a robot's self moving matter, localization for recognizing its own position is essential for performing a job by itself while moving around. One of localization technologies is a simultaneous localization and mapping (SLAM). The SLAM of a robot is a method of detecting surrounding environment information, processing obtained information, making a map corresponding to a space for performing a job, and tracking its own absolute position.

Various sensors such as a global positioning system (GPS), light detection and ranging (LIDAR), or a camera have been conventionally used with odometry to estimate the position of a robot. However, the GPS is often erroneous and works properly only in an outdoor environment. The LIDAR is known to be accurate but easily fails to track the position of a robot due to non-reflection of light when used outdoors.

SUMMARY

One or more exemplary embodiments provide a method and apparatus for estimating a position of a moving vehicle such as mobile robot by which the position of the moving vehicle may be effectively estimated at a low cost using an image obtained from a single camera.

According to an aspect of an exemplary embodiment, there is provided an apparatus of estimating a position of a moving vehicle. The apparatus may include a feature point matching unit which generates vectors connecting feature points of a previous image frame and feature points of a current image frame, corresponding to the feature points of the previous image frame, and determines spatial correlations between the feature points of the current image frame, a clustering unit which configures at least one motion cluster by grouping at least one vector among the vectors based on the spatial correlations in a feature space, and a noise removal unit which removes noise from each motion cluster of the at least one motion cluster, wherein the position of the moving vehicle is estimated based on the at least one motion cluster.

The feature point matching unit may include a feature point extraction unit which tracks the feature points of the current image, and generates the vectors connecting the corresponding feature points between the two image frames by detecting optical flow of each pixel, and a correlation determination unit which determines the spatial correlations.

According to an aspect of another exemplary embodiment, there is provided a method of estimating a position of a moving vehicle. The method may include generating vectors connecting feature points of a previous image frame and feature points of a current image frame corresponding to the feature points of the previous image frame, determining spatial correlations between the feature points of the current image frame, configuring at least one motion cluster by grouping the vectors based on the spatial correlations in a feature space, and removing noise from each motion cluster of the at least one motion cluster.

BRIEF DESCRIPTION OF DRAWINGS

The above and other aspects will become more apparent by describing in detail exemplary embodiments with reference to the attached drawings, in which.

DETAILED DESCRIPTION OF EXEMPLARY EMBODIMENTS

The attached drawings for illustrating exemplary embodiments are referred to in order to gain a sufficient understanding of the inventive concept, the merits thereof, and the objectives accomplished by the implementation of the inventive concept. Hereinafter, exemplary embodiments will be described in detail with reference to the attached drawings. Like reference numerals in the drawings denote like elements.

Figure 1:
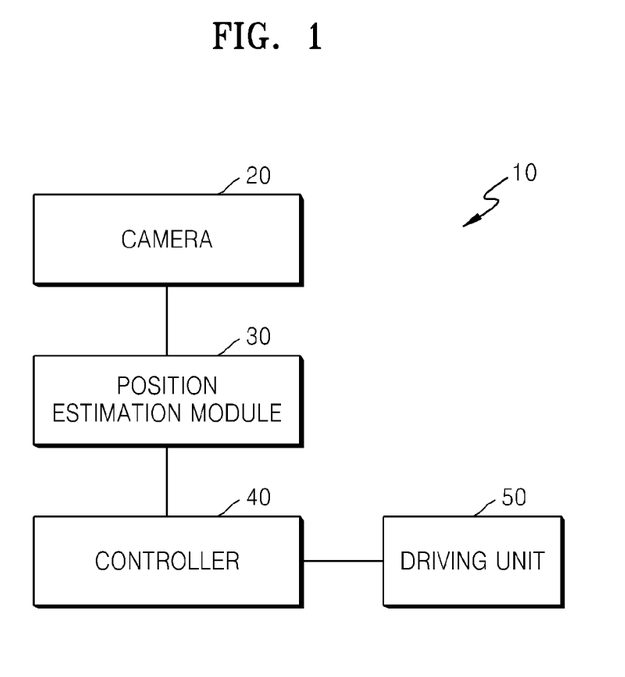
FIG. 1 is a block diagram schematically illustrating an internal structure of a robot according to an exemplary embodiment.

FIG. 1 is a block diagram schematically illustrating an internal structure of a robot 10 according to an exemplary embodiment. Referring to FIG. 1, the robot 10 according to the present exemplary embodiment includes a camera 20, a position estimation module 30, a controller 40, and a driving unit 50.

The robot 10 may be a mobile robot for performing a particular job while moving around in a predetermined area. The movement and job performance of the robot 10 are automatically executed. For this purpose, the robot 10 needs to accurately recognize its own position.

The camera 20 obtains an image of a scene that the robot 10 sees directly ahead in a moving direction. The direction in which a scene is to be obtained may be changed by rotating the robot 10 or by horizontally rotating the camera 20 around the center of the robot 10.

The position estimation module 30 estimates a position of the robot 10. Since the robot 10 is equipped with the camera 20, position estimation by the camera 20 and position estimation by the robot 10 may be interchangeably referred to in the following description to describe the same position estimation. The position estimation module 30 analyzes the position of the robot 10 or the camera 20 based on a feature point matching algorithm of two sequential video frames, without using GPS or odometry information. Various algorithms may be used for processing information of the position estimation module 30. A simultaneous localization and mapping (SLAM) technology may be typically used therefor. The SLAM is a method of estimating an absolute position in a space using a relative position value of the robot 10 and a surrounding environment.

The position estimation module 30 extracts a feature point from a current image frame and a feature point from a previous image frame, and matches the feature points extracted from the two image frames. During feature point matching, the position estimation module 30 extracts and tracks the feature points using a Kanade-Lucas-Tomasi (KLT) tracker and a Harris corner detector, and sets correlations between the feature points by applying a Delaunay triangulation technique, thereby obtaining spatial information.

The position estimation module 30 clusters vectors generated by the feature point matching using the spatial information among the feature points. The position estimation module 30 may perform clustering by applying a Markov random field (MRF) optimization algorithm to a feature space.

The position estimation module 30 removes noise by excluding an outlier of each cluster, and determines a fundamental matrix for each cluster. The position estimation module 30 may remove the outlier by applying random sample consensus (RANSAC) to each cluster.

The controller 40 controls the operations of the position estimation module 30 and the driving unit 50. The driving unit 50 controls the movement of the robot 10 and provides power to the robot 10. The driving unit 50 includes arms, legs, joints or wheels, and may be configured by a mechanism including a direction control apparatus, a drive motor, gears, etc. to move the robot 10.

Figure 2:
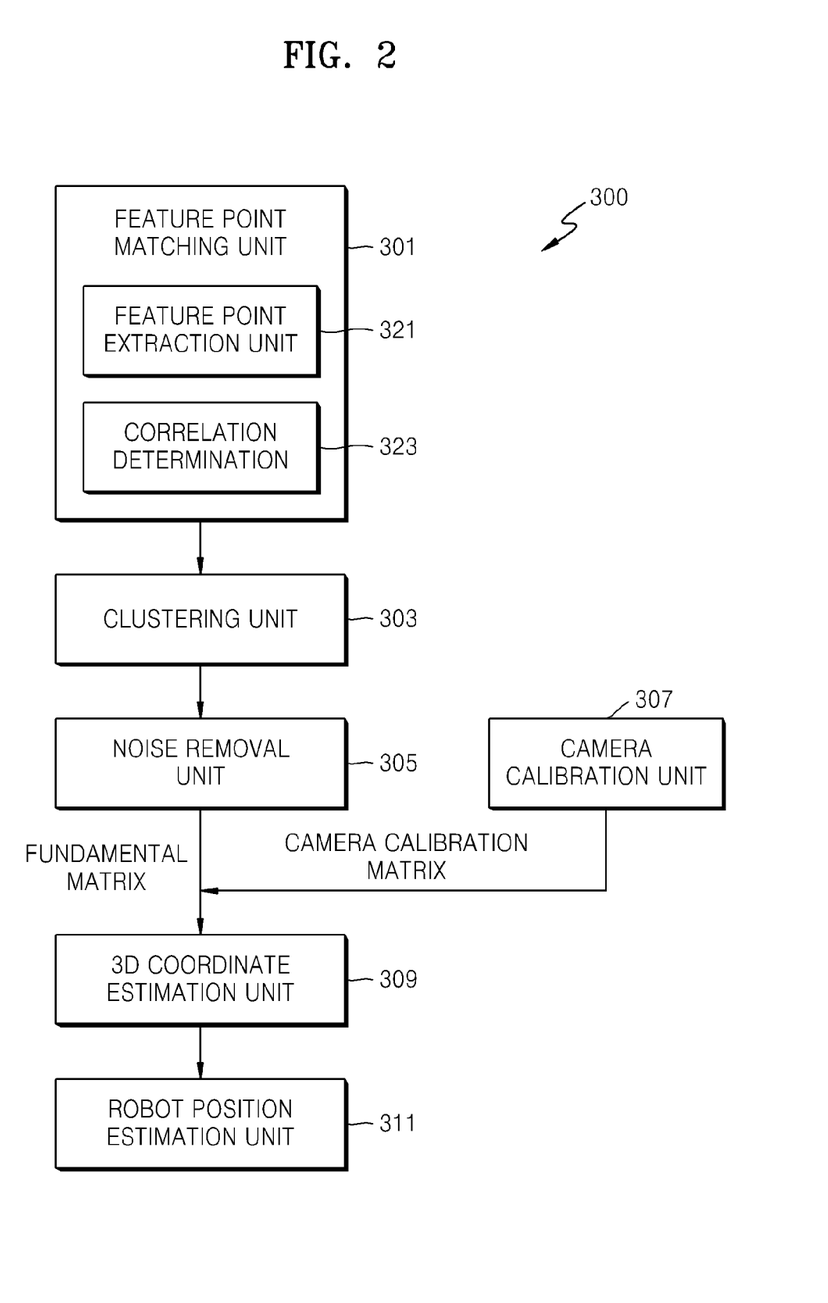
FIG. 2 is block diagram schematically illustrating an internal structure of an apparatus for estimating the position of a robot according to an exemplary embodiment.

FIG. 2 is block diagram schematically illustrating an internal structure of an apparatus 300 for estimating the position of a robot, according to an exemplary embodiment. The apparatus 300 may represent the position estimation module 30 in FIG. 1. Referring to FIG. 2, the robot position estimation apparatus 300 includes a feature point matching unit 301, a clustering unit 303, a noise removal unit 305, a camera calibration unit 307, a three-dimensional (3D) coordinate estimation unit 309, and a robot position estimation unit 311.

The feature point matching unit 301 extracts a feature point from a current image frame and a feature point from a previous image frame input by the camera 20, and matches the feature points extracted from the two image frames. The matching includes an operation of identifying corresponding points between the current image frame and the previous image frame.

A related art fundamental matrix determination algorithm using feature point matching operates only in a static environment due to its own characteristic. For example, when an epipolar constraint condition is use, at least seven matched feature points are needed to determine a fundamental matrix. These matched two feature points that are corresponding points or correspondences are located on epipolar lines of different cameras. Thus, assuming that the corresponding points are points extracted from a mobile object, the corresponding points may not be located on an epipolar line.

The feature point matching unit 301 of the present exemplary embodiment performs accurate feature point matching in a dynamic environment using a matching type of a feature point, that is, a context of a moving history. The feature point matching unit 301 includes a feature point extraction unit 321 and a correlation determination unit 323.

Figure 3:
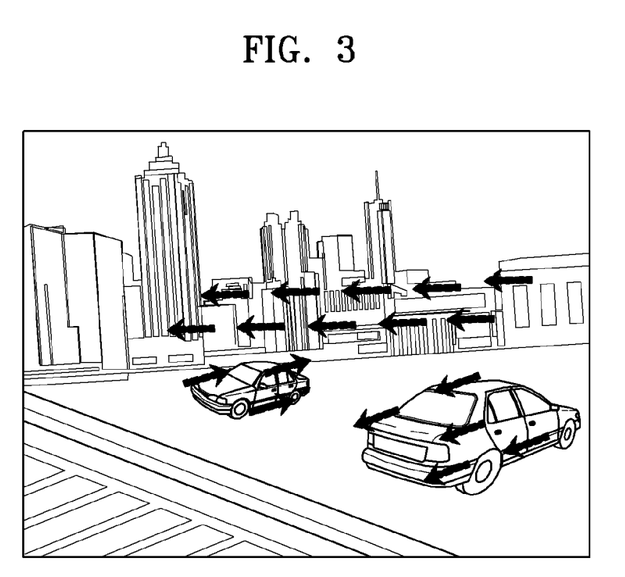
FIG. 3 illustrates an example in which vectors are indicated according to feature point matching performed on input image frames according to an exemplary embodiment.

The feature point extraction unit 321 extracts feature points from a current image frame and corresponding feature points from a previous image frame. That is, the feature point extraction unit 321 extracts feature points of a current image frame corresponding to those of a previous image frame, and generates vectors connecting the corresponding feature points between the two image frames by detecting optical flow of each pixel. The optical flow signifies a movement, which is represented by a set of vectors, appearing on two input image frames, photographed by a camera, at different time points. FIG. 3 illustrates an example in which vectors are indicated according to feature point matching performed on input image frames according to an exemplary embodiment.

The feature point extraction unit 321 may extract feature points by using the KLT tracker and the Harris corner detector. The present inventive concept is not limited thereto, and a variety of methods for extracting a feature point may be employed therefor.

The correlation determination unit 323 determines spatial correlations with respect to feature points of an image frame. The points that are spatially adjacent to each other are highly likely to belong to the same object and have the same movement.

The correlation determination unit 323 may indicate a correlation between feature points by triangularizing the feature points on a two-dimensional (2D) plane using, for example, the Delaunay triangulation technique. However, the inventive concept is not limited thereto, and other triangulation techniques capable of defining spatial correlations may be used therefor.

Figure 4:
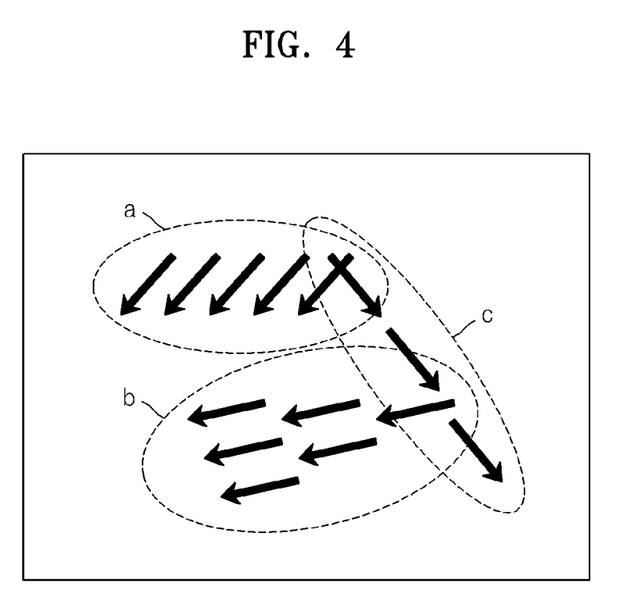
FIG. 4 illustrates an example in which motion clusters of an input image frame are configured according to an exemplary embodiment.

The clustering unit 303 performs spatially coherent motion clustering to group static backgrounds and a plurality of movements. The clustering unit 303 groups vectors based on spatial correlations considering positions of the vectors in the feature space with parameters of vectors' movement directions, thereby configuring at least one motion cluster. FIG. 4 illustrates an example in which motion clusters a, b, and c of an input image frame are configured according to an exemplary embodiment.

The clustering unit 303, for example, may perform motion clustering by applying the MRF optimization algorithm to a lattice formed in a triangle by the Delaunay triangulation technique. A graph-cut technique may be used to MRF optimization. However, the inventive concept is not limited thereto, and a variety of techniques capable of performing clustering may be used therefor.

The noise removal unit 305 configures at least one motion cluster removed of noise by removing an outlier from each motion cluster. An outlier that is one of the vectors has a large error in a motion cluster, that is, a vector having a remarkably low consistency. The outlier is noise including a sensor outlier generated by sensor noise and a motion outlier generated by a mobile object. The noise removal unit 305 determines a fundamental matrix for each motion cluster removed of noise.

Since the influence of outliers on the determination of a fundamental matrix is very large, it is very important to remove outliers in determining a fundamental matrix. In the present exemplary embodiment, outliers may be removed by applying RANSAC to each motion cluster.

The camera calibration unit 307 determines a camera calibration matrix by obtaining camera internal parameters. The 3D coordinate estimation unit 309 determines 3D coordinates of feature points based on camera external parameters such as rotation and translation of the camera 20 for each motion cluster. The 3D coordinate estimation unit 309 determines an essential matrix from the fundamental matrix and the camera calibration matrix. The 3D coordinate estimation unit 309 extracts rotation and translation components of the camera 20 from the determined essential matrix. Next, the 3D coordinate estimation unit 309 determines a camera matrix from the essential matrix and determines 3D coordinates of the camera 20 from the camera matrix.

The robot position estimation unit 311 estimates a position of the robot 10 based on the 3D coordinates of the camera 20 determined for each motion cluster. The robot position estimation unit 311 estimates the position of the robot 10 by tracking a relative position of the camera 20 determined for each motion cluster on an assumption of a constant speed. In doing so, an extended Kalman filter algorithm may be used.

Figure 5:
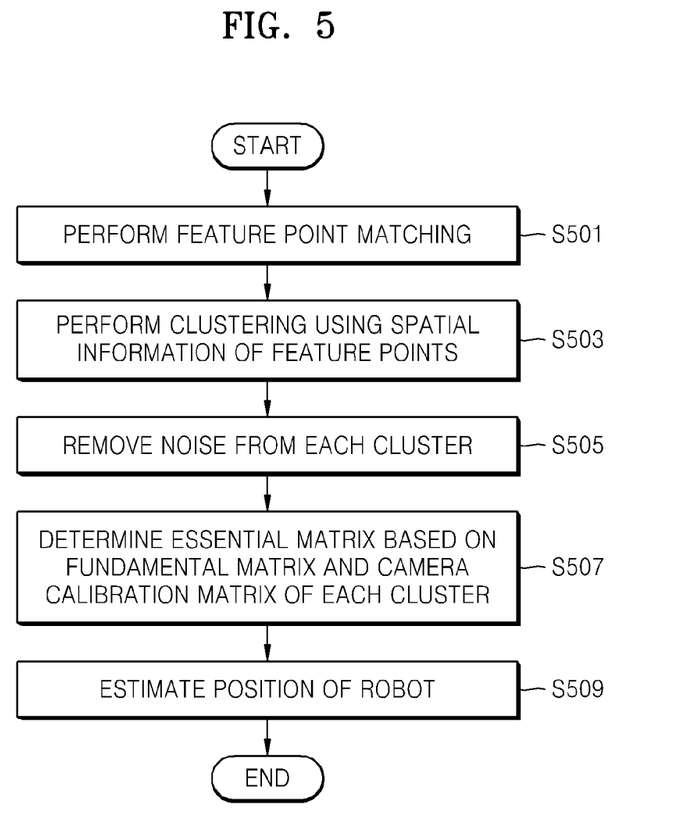
FIG. 5 is a flowchart for explaining a method of estimating the position of a robot according to an exemplary embodiment.

FIG. 5 is a flowchart for explaining a method of estimating a position of a robot according to an exemplary embodiment, in reference to FIGS. 1 and 2. Referring to FIG. 5, the robot 10 extracts feature points from input image frames and matches the feature points extracted from a current image frame and a previous image frame (S501). The robot 10 may extract and track the feature points using the KLT tracker and the Harris corner detector, and set correlations between the feature points by applying the Delaunay triangulation technique, thereby obtaining spatial information.

The robot 10 clusters vectors generated by the feature point matching, using spatial information between the feature points (S503). The robot 10 may perform clustering by applying the MRF optimization algorithm to a feature space.

The robot 10 removes noise by excluding an outlier of each cluster (S505). The robot 10 may remove the outlier by applying the RANSAC to each cluster.

The robot 10 determines an essential matrix based on a fundamental matrix and a camera calibration matrix determined on each cluster removed of noise (S507). The rotation and translation components of the camera 20 are extracted from the essential matrix. As a camera matrix is determined from extracted rotation and translation components, 3D coordinates of the camera 20 may be determined. The 3D coordinates include rotation and translation parameters.

The robot 10 estimates its position based on the 3D coordinates of the camera 20 determined for each cluster (S509).

Figure 6:
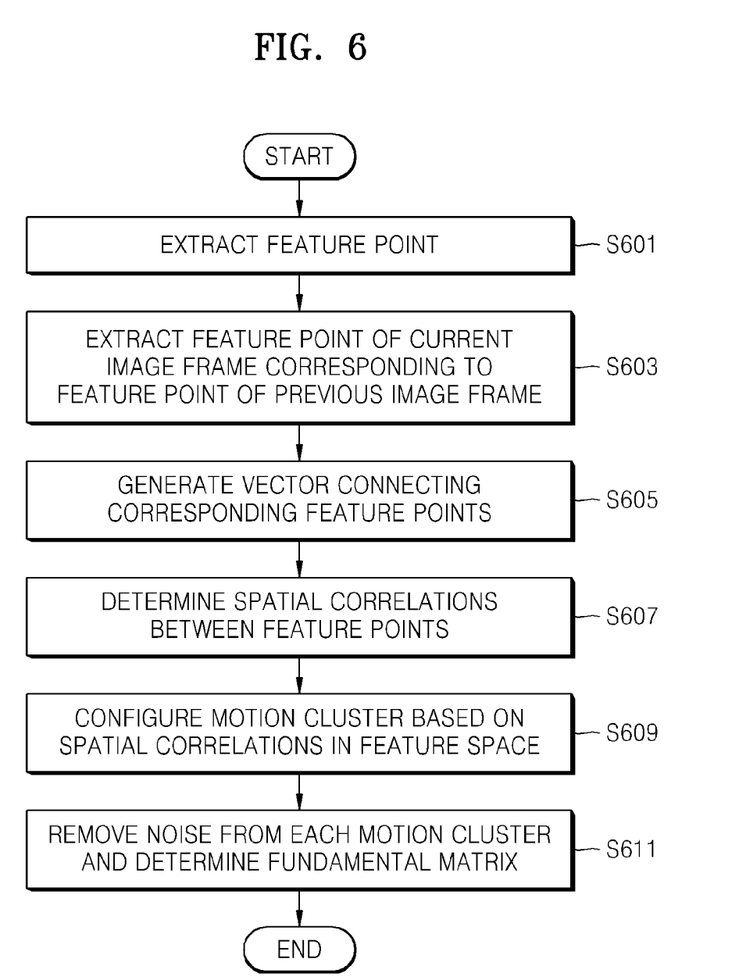
FIG. 6 is a flowchart for explaining a method of determining a fundamental matrix for estimating the position of a robot according to an exemplary embodiment.

FIG. 6 is a flowchart for explaining a method of determining a fundamental matrix for estimating the position of a robot according to an exemplary embodiment, in reference to FIGS. 1, 2 and 5. Referring to FIG. 6, the position estimation module 30 of the robot 10 extracts feature points from input image frames (S601). The position estimation module 30 tracks feature points of a current image frame corresponding to feature points of a previous image frame (S603). The position estimation module 30 detects optical flow of each pixel and generates vectors connecting the corresponding feature points between the two image frames (S605). The position estimation module 30 determines spatial correlations between the feature points (S607). The position estimation module 30 configures a motion cluster based on the spatial correlations in a feature space (S609). The position estimation module 30 removes noise from each motion cluster by excluding an outlier for each motion cluster and determines a fundamental matrix for each motion cluster (S611).

Since the exemplary embodiments require only one camera, a portable system may be implemented. Also, in the field of mobile robots, cost of sensors such as a GPS or an odometry may be reduced, and thus, a size or a weight of a system may be reduced as well.

In addition, since the exemplary embodiments use a robust feature point matching algorithm, a 3D environment may be reconfigured using amateur video images and uploaded on a web.

As described above, according to the exemplary embodiments, an accurate position of a robot may be estimated by determining a firm fundamental matrix using an image obtained from a single camera under a dynamic environment in which various movements exist.

While exemplary embodiments have been particularly shown and described, it will be understood by those skilled in the art that various changes in form and details may be made therein without departing from the spirit and scope of the inventive concept as defined by the appended claims.

What is claimed is:

1. An apparatus of estimating a position of a moving vehicle, the apparatus comprising:
    a feature point matching unit which generates vectors connecting feature points of a previous image frame and feature points of a current image frame, corresponding to the feature points of the previous image frame, and determines spatial correlations between the feature points of the current image frame;
    a clustering unit which configures at least one motion cluster by grouping at least one vector among the vectors based on the spatial correlations; and
    a noise removal unit which removes noise from each motion cluster of the at least one motion cluster,
    wherein the position of the moving vehicle is estimated based on the at least one motion cluster.

2. The apparatus of claim 1, further comprising a position estimation unit which estimates the position of the moving vehicle based on each motion cluster from which the noise has been removed,
    wherein the current image frame and the previous image frame are obtained by one single image obtaining unit, installed on the moving vehicle, at two different time points.

3. The apparatus of claim 2, further comprising a three-dimensional (3D) coordinate estimation unit which determines 3D coordinates of the image obtaining unit based on each motion cluster from which the noise has been removed,
    wherein the position estimation unit estimates the position of the moving vehicle based on the 3D coordinates of the image obtaining unit.

4. The apparatus of claim 1, further comprising;
    a three-dimensional (3D) coordinate estimation unit which, based on each motion cluster from which the noise has been removed, determines 3D coordinates of one single image obtaining unit, installed on the moving vehicle, which obtains the current image frame and the previous image frame at two different time points; and
    a position estimation unit which estimates the position of the moving vehicle based on the 3D coordinates of the image obtaining unit.

5. The apparatus of claim 4, wherein the clustering unit configures a plurality of motion clusters by grouping at least one vector among the vectors based on the spatial correlations, wherein the 3D coordinate estimation unit determines a 3D coordinate of the image obtaining unit for each of the plurality of motion clusters from which the noise has been removed, and wherein the position estimation unit estimates the position of the moving vehicle based on the 3D coordinate of the image obtaining unit for each of the plurality of motion clusters from which the noise has been removed.

6. The apparatus of claim 1, wherein the noise of each motion cluster comprises a vector which is inconsistent with the other vectors in the each motion cluster.

7. The apparatus of claim 1, wherein the feature point matching unit comprises:

a feature point extraction unit which tracks the feature points of the current image, and generates the vectors connecting the corresponding feature points between the two image frames by detecting optical flow of each pixel; and a correlation determination unit which determines the spatial correlations.

8. The apparatus of claim 7, wherein the feature point extraction unit extracts the feature points using a Kanade-Lucas-Tomasi (KLT) tracker and a Harris corner detector, wherein the correlation determination unit triangularizes the feature points on a two-dimensional (2D) plane using a Delaunay triangulation technique, wherein the clustering unit configures the at least one motion cluster by applying a Markov random field (MRF) optimization algorithm using graph-cut in a feature space, and wherein the noise removal unit removes the noise by applying random sample consensus (RANSAC) to each motion cluster of the at least one motion cluster.

9. The apparatus of claim 1, further comprising;

a calibration unit which determines a calibration matrix using internal parameters of an image obtaining unit, installed on the moving vehicle, which obtains the current image frame and the previous image frame at two different time points;

a three-dimensional (3D) coordinate estimation unit which determines an essential matrix based on the calibration matrix and a fundamental matrix determined by the noise removal unit with respect to each motion cluster, and determines 3D coordinates of the image obtaining unit based on the essential matrix; and a position estimation unit which estimates the position of the moving vehicle based on the 3D coordinates of the image obtaining unit.

10. The apparatus of claim 8, wherein the clustering unit configures a plurality of motion clusters by grouping at least one vector among the vectors based on the spatial correlations, wherein the 3D coordinate estimation unit determines a 3D coordinate of the image obtaining unit for each of the plurality of motion clusters from which the noise has been removed, and wherein the position estimation unit estimates the position of the moving vehicle based on the 3D coordinate of the image obtaining unit for each of the plurality of motion clusters from which the noise has been removed.

11. A method of estimating a position of a moving vehicle, the method comprising:

generating vectors connecting feature points of a previous image frame and feature points of a current image frame corresponding to the feature points of the previous image frame;

determining spatial correlations between the feature points of the current image frame;

configuring at least one motion cluster by grouping the vectors based on the spatial correlations; and removing noise from each motion cluster of the at least one motion cluster.

12. The method of claim 11, further comprising estimating the position of the moving vehicle based on each motion cluster from which the noise has been removed, wherein the current image frame and the previous image frame are obtained by one single image obtaining unit, installed on the moving vehicle, at two different time points.

13. The method of claim 12, further comprising determining three-dimensional (3D) coordinates of the image obtaining unit based on each motion cluster from which the noise has been removed, wherein the estimating the position of the moving vehicle based on each motion cluster from which the noise has been removed is performed based on the 3D coordinates of the image obtaining unit.

14. The method of claim 11, further comprising;

determining three-dimensional (3D) coordinates of one single image obtaining unit, installed on the moving vehicle, which obtains the current image frame and the previous image frame at two different time points, based on each motion cluster from which the noise has been removed; and estimating the position of the moving vehicle based on the 3D coordinates of the image obtaining unit.

15. The method of claim 14, wherein the configuring at least one motion cluster comprises configuring a plurality of motion clusters by grouping at least one vector among the vectors based on the spatial correlations, wherein the determining the 3D coordinates comprises determining a 3D coordinate of the image obtaining unit for each of the plurality of motion clusters from which the noise has been removed, and wherein the estimating the position of the moving vehicle is performed based on the 3D coordinate of the image obtaining unit for each of the plurality of motion clusters from which the noise has been removed.

16. The method of claim 11, wherein the noise of each motion cluster comprises a vector which is inconsistent with the other vectors in the each motion cluster.

17. The method of claim 11, wherein the generating the vectors comprises:

tracking the feature points of the current image frame corresponding to the feature points of the previous image frame; and generating the vectors connecting the corresponding feature points between the two image frames by detecting optical flow of each pixel.

18. The method of claim 11, wherein the feature points are extracted using a Kanade-Lucas-Tomasi (KLT) tracker and a Harris corner detector, wherein the determining the spatial correlations comprises determining the spatial correlations by triangularizing the feature points on a two-dimensional (2D) plane using a Delaunay triangulation technique, wherein the configuring the motion cluster comprises configuring the motion cluster by applying a Markov random field (MRF) optimization algorithm using graph-cut in a feature space, and wherein the removing the noise comprises removing an outlier by applying random sample consensus (RANSAC) to each motion cluster.

19. The method of claim 11, further comprising determining a calibration matrix using internal parameters of an image obtaining unit, installed on the moving vehicle, which obtains the current image frame and the previous image frame at two different time points;
   determining an essential matrix based on the calibration matrix and a fundamental matrix determined with respect to each motion cluster, and determines three-dimensional (3D) coordinates of the image obtaining unit based on the essential matrix; and
   estimating the position of the moving vehicle based on the 3D coordinates of the image obtaining unit.

20. The method of claim 19, wherein the configuring at least one motion cluster comprises configuring a plurality of motion clusters by grouping at least one vector among the vectors based on the spatial correlations,
   wherein the determining the 3D coordinates comprises determining a 3D coordinate of the image obtaining unit for each of the plurality of motion clusters from which the noise has been removed, and
   wherein the estimating the position of the moving vehicle is performed based on the 3D coordinate of the image obtaining unit for each of the plurality of motion clusters from which the noise has been removed.

* * * * *